Aug. 14, 1934.    L. ROEBEL    1,970,338
CONSTANT CURRENT DIRECT CURRENT GENERATOR
Filed Jan. 3, 1933    3 Sheets-Sheet 1

Inventor:
Ludwig Roebel,
By Byrnes Townsend & Potter,
Attorneys.

Aug. 14, 1934.    L. ROEBEL    1,970,338
CONSTANT CURRENT DIRECT CURRENT GENERATOR
Filed Jan. 3, 1933    3 Sheets-Sheet 2

Inventor:
Ludwig Roebel.
By Byrnes, Townsend & Potter,
Attorneys.

Patented Aug. 14, 1934

1,970,338

UNITED STATES PATENT OFFICE

1,970,338

CONSTANT CURRENT DIRECT CURRENT GENERATOR

Ludwig Roebel, Mannheim, Germany

Application January 3, 1933, Serial No. 650,003
In Germany November 19, 1931

23 Claims. (Cl. 171—223)

An ordinary direct current generator with shunt excitation is not suitable for services where large sudden loads and frequent short circuits occur, such as in welding, because as a result of the magnetic inertia of the excitation circuit current rushes arise when the short circuit occurs, and when the short circuit is overcome the voltage returns too slowly.

A known method of limiting these current rushes is by means of a demagnetizing series winding. This medium does not, however, ensure that the voltage will build up rapidly again and furthermore during normal operation the effect of the differential compounding winding must be compensated. The machines used up to the present do not satisfy the service conditions described above, in addition to which the demands as regards simplicity, economy and effective current regulation have also to be considered. The devices used to adapt the machines to the conditions stipulated are generally clumsy and involved, or the machine itself is of some special and abnormal design.

A general object of the present invention is to solve these difficulties by means of a new and very effective arrangement. An object is to provide a direct current generator having a shunt winding and a pair of opposed series windings, i. e. the respective series windings are wound in such sense that current flow in one winding adds to the excitation of the shunt field while current flow in the other series winding neutralizes a part of the shunt field excitation; the two series windings having the characteristic, due either to their relative self-inductances or to the action of other elements associated therewith, that the demagnetizing series winding reacts more quickly to sudden current changes than does the cumulative series winding. More particularly, an object is to provide a machine including, or having the same operating characteristic as one including, in addition to an ordinary shunt excitation winding two opposed and in parallel connected series windings one of which magnetizes in the same sense as the shunt excitation winding and possesses a greater self-inductance than the other one which has a demagnetizing effect.

When a short circuit occurs and the current increases, the higher self-induction of the magnetizing branch forces the major portion of the current into the demagnetizing branch and this results in an immediate weakening of the main field. On the current being interrupted, the energy which has been stored up due to the large self-induction of the magnetizing branch is now released and causes an equalizing current to flow which has a magnetizing effect in both parallel windings and rapidly builds up the main field again.

The objects and advantages of the invention will be apparent from the following specification when taken with the accompanying drawings, in which.

Figure 8:
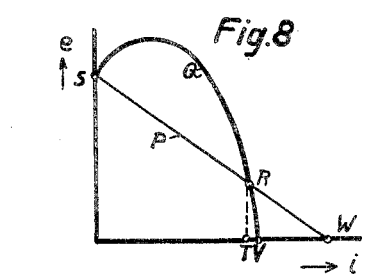
Figure 9:
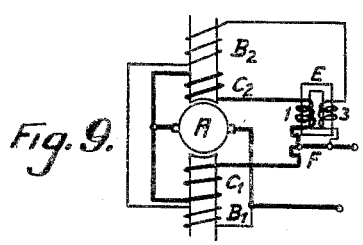
Figure 15:
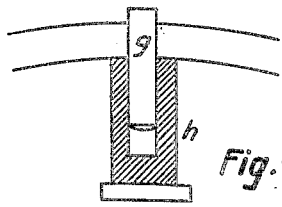
Figure 15:
Figure 16:
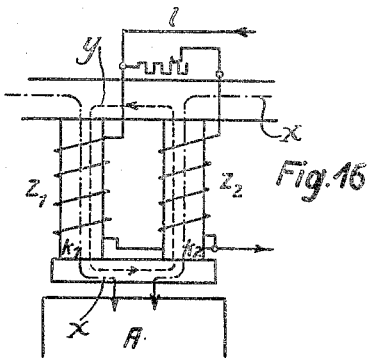
Figure 17:
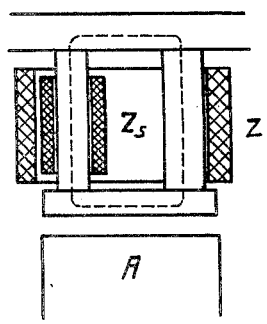
Figure 21:
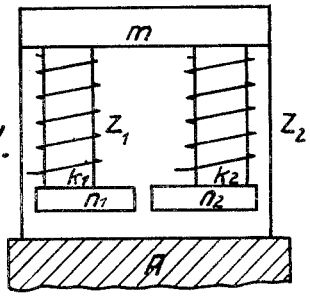
Figure 18:
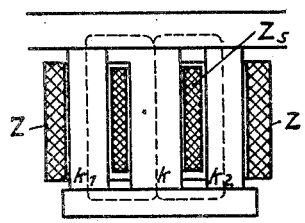
Figure 22:
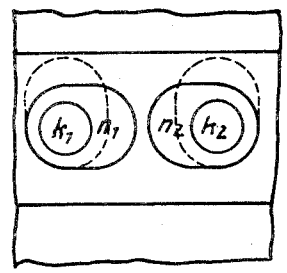
Figure 19:
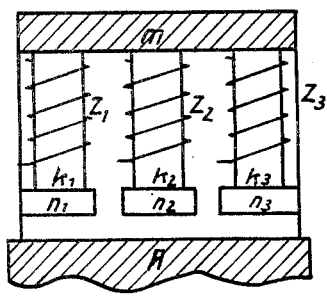
Figure 23:
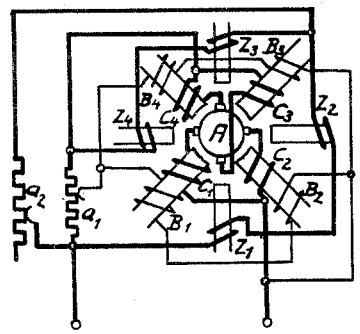
Figure 20:
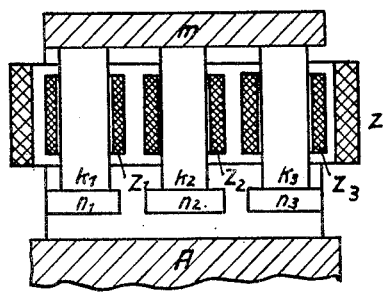

Figs. 3 to 7 inclusive are circuit diagrams of other embodiments;

Fig. 8 is a curve sheet comparing the voltage-current characteristic of an embodiment of the invention with the same characteristic of a generator having a current-limiting resistance;

Figs. 9 to 14 are circuit diagrams of further embodiments;

Fig. 15 is a fragmentary sectional view of an interpole provided with an adjusting pin;

Figs. 16, 17 and 18 are fragmentary diagrammatic illustrations of different arrangements for obtaining saturation at a point in the magnetic circuit;

Figs. 19 and 20 are similar fragmentary views illustrating axially divided interpole cores and core shoes which may be used in embodiments of the invention;

Figs. 21 and 22 are a fragmentary side view and end elevation of a generator having axially divided interpoles which carry eccentric and adjustable pole shoes; and Fig. 23 is a circuit diagram of a multipole generator embodying the invention.

Figure 1:
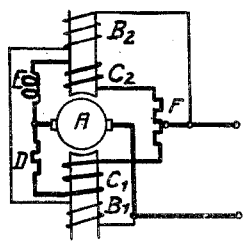
Fig. 1 is a circuit diagram of an embodiment of the invention.

Fig. 1 shows diagrammatically a bipolar direct current generator A with shunt excitation windings $B_1$, $B_2$ and parallel connected series windings $C_1$, $C_2$. The shunt windings can be connected together as desired and may be fed from an external voltage source. A choke coil E is connected in series with the winding $C_2$ in order to increase the inductance of this parallel branch. To balance the distribution of current in the windings $C_1$ and $C_2$ a resistor D or F or both together may be employed. If necessary these resistors can be dispensed with, depending on the dimensions of the windings $C_1$ and $C_2$ and the choke coil E. When using a resistor F there is the advantage that by displacing the connecting point of the external circuit the mutual effect of the windings $C_1$ and $C_2$ can be altered in a very simple way. The same effect can be obtained if at least one of the series windings is made adjustable.

Figure 2:
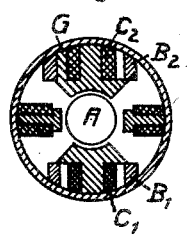
Fig. 2 is a diagrammatic cross-section of the magnetic circuits and the field windings according to another embodiment of the invention.

The inductance of the magnetizing series circuit can be increased in any known manner. It is not essential that a choke coil be employed for this purpose. It might be an advantage to design the magnetic circuit of the magnetizing series winding differently from that of the demagnetizing winding. Fig. 2 shows an example of this. The designation of the windings is the same as in Fig. 1. The magnetizing series winding $C_2$ is supplied with a magnetic return-shunt G which is not employed with the demagnetizing winding. The effect is practically the same as that obtained when using a choke coil E. The magnetic return shunt enables a favourable regulation of the inductance of the parallel connected windings $C_1$, $C_2$ to be obtained if it has an adjustable air gap or a variable cross-section.

Damping windings on the main poles and a combination of series resistors, series choke coils, parallel connected resistors and parallel choke coils, enables according to the invention the same technical effect to be obtained as previously described. This is obtained by causing the series winding with the compounding effect to behave with reference to free current oscillations in a manner which is equivalent to it possessing a high self-inductance.

Figure 3:
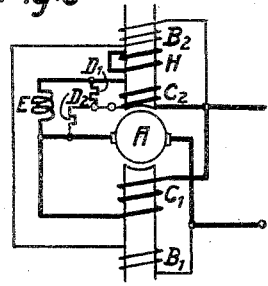

Fig. 3 shows a constructional example of the invention incorporating some of these auxiliary devices. For the sake of unity a two-pole machine is again illustrated, although the number of poles is of no account. $B_1$ and $B_2$ are the shunt windings, $C_1$ and $C_2$ the series windings and E the choke coil already described. The auxiliary devices comprise the damping winding H and the resistors $D_1$ and $D_2$ which when suitably dimensioned, have the same effect as the choke coil E. The resistance $D_1$ is shunted across winding $C_2$, and resistance $D_2$ is in series with this parallel combination of $D_1$, $C_2$. In consequence, independently of the arrangement shown in Fig. 3, each auxiliary device (resistor or coil) can be fitted by itself without the other. When they are arranged in combination the effects support each other.

Figure 4:
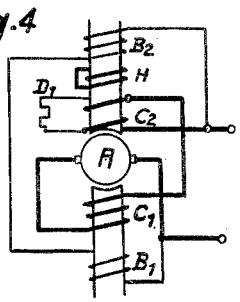

When these auxiliary devices are suitably designed an effect equivalent to using parallel connected series windings with different self-inductance can also be obtained, if the series windings are connected in series as shown in Fig. 4. When the current is increasing the demagnetizing winding $C_1$ first becomes effective, on account of the effect of the damping winding H and parallel resistor $D_1$, so that the main field is rapidly weakened.

The arrangements shown in Figs. 3 and 4 are merely examples which illustrate how the above described auxiliary devices can be used to obtain an effect which is equivalent to that obtainable with parallel connected series windings having different self-inductances. These examples show at the same time that a large number of different arrangements are possible by combining the various auxiliary devices in different ways according to the invention.

Figure 5:
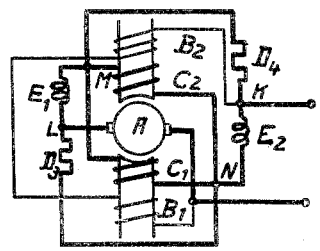

An extreme case of the invention is when the magnetizing as well as the demagnetizing effect is obtained from both series windings according to the operation of the machine by means of a suitable choice and arrangement of auxiliary devices. This is done according to the invention by means of a bridge connection as illustrated in Fig. 5. The sides of the bridge, with feeding points K and L, are formed by alternate choke coils $E_1$ and $E_2$ and resistors $D_3$ and $D_4$. The series windings $C_1$ and $C_2$ form the diagonal of the bridge between the points M and N. $B_1$ and $B_2$ are the shunt windings. During normal operation no current passes through the series windings in so far as the ohmic resistance of the choke coils $E_1$, $E_2$ is balanced against the resistors $D_3$, $D_4$. When the current rises the effect of the choke coils is to cause the main current to flow through the windings $C_1$, $C_2$ and in a demagnetizing sense so that the main field is immediately weakened. With the return of the current the choke coils discharge their energy through the windings in the form of a current with a magnetizing effect and so assist the main field to build up again rapidly. With this arrangement the series windings can be arranged either in series or in parallel and have the same effect. Furthermore, a large number of combinations with choke coils and resistors as sides of the bridge connection are possible. For example, the sides with the choke coils $E_1$, $E_2$ can have resistors arranged in series to balance the current distribution during normal operation. Individual or all choke coils and resistors may be made adjustable and the points K, L, M, N can be connected directly to tapping points on the coils and resistors. In accordance with the invention the external branches of the bridge connection can be supplemented by compounding or differential compounding windings.

The condition that the same machine should be capable of commanding a larger range of current without the above described properties being detrimentally influenced for a portion of the current range, offers no difficulties for a machine designed according to this invention. If, for example, a machine designed for high operating currents and built in accordance with the invention has to be used for a comparatively small current, the described magnetizing and demagnetizing effect of the series windings would be considerably weakened. This can, however, according to the invention be remedied by adopting various simple arrangements. If the increase in self-inductance of the magnetizing branch be accomplished by means of a choke coil E as in Fig. 1 the choke coil E can be made adjustable so that for a large current, the choke coil has a smaller inductance than for a small current. It is an advantage to endeavour to maintain the coil energy about equal for large and small currents. This can also be achieved by means of a resistor connected in parallel with the choke coil. The effect of the choke coil E in the magnetizing current branch can be weakened by connecting a suitably dimensioned choke coil in the demagnetizing branch.

Figure 6:
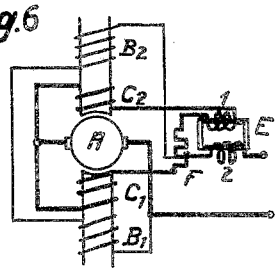

The arrangement according to the invention shown in Fig. 6 offers considerable advantages when operating with small currents. $B_1$, $B_2$ are the shunt windings, $C_1$ the demagnetizing and $C_2$ the magnetizing series windings, F the resistor over which the series windings are connected in parallel, and E the choke coil of which the winding 1 lies in the circuit of the compounding winding $C_2$. The choke coil E is supplied with a second winding 2 connected in the main current circuit, so that the choke coil thus becomes a transformer. The coil 2 is wound in such a manner that the magnetic field produced by the main current flowing through it supplements the field produced by the partial current flowing in the coil 1. This arrangement enables the field of the choke coil E to be just as powerful for a small current as for a large current, without the resistance of coil 1 becoming too high as result of the windings having to be increased.

Figure 7:
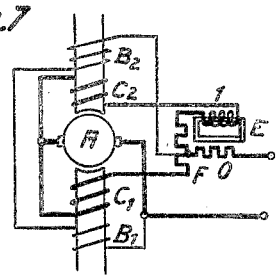

Another constructional example of the invention for ensuring a particularly favourable building up of the voltage after the short circuit has been cleared and when operating with a small current is shown in Fig. 7 where an ohmic resistor O is connected in the main circuit between the main terminal and the point where the shunt winding is connected up to the main circuit. When a short circuit occurs the resistor O enables the main field of the machine to be maintained so that when the short circuit is interrupted the voltage does not have to build up again from zero but is available at a certain level depending upon the value of the resistor. At the place where the short circuit is interrupted, that is, at the welding place when the generator is used for the purpose of welding, there is at that instant a high voltage available which can maintain the welding arc. This is partly due to the residual field maintained by the resistor O and partly due to the known effect of the choke coil. The employment of this resistor does not entail any disadvantages because its ohmic losses for small currents need not be taken into account in big machines. The effect of this resistor when used with constant current machines designed in accordance with the invention is different to that obtained with welding plants supplied through a resistor from a direct current system, or driven by an ordinary direct current machine. This difference is shown graphically in Fig. 8. The straight line PW represents the characteristic of a welding plant employing a series resistor and the curve QRV shows the characteristic of a machine with an ohmic resistor O (Fig. 7) connected in the main circuit. The ordinates represent the voltage and the abscissae the current in Fig. 8. The same operating point R and no-load point S have been chosen for both plants. On the occurrence of a short circuit each plant behaves entirely differently. The increase in current with a machine according to the invention is represented by the amount TV in Fig. 8, while for a plant of the known kind the current rise is considerably greater, namely TW. This leads to the obvious conclusion that welding plants known to the art use a resistor as an indispensable medium for limiting the current, without having any influence on the maintenance of the voltage during a short circuit. In the invention, however, the resistor in the main circuit has a subordinate effect on the value of the current and is used solely to maintain the level of the voltage at which operation recommences after a short circuit has occurred.

A particularly effective result is obtained by means of a combination of the arrangements illustrated in Figs. 6 and 7, whereby the ohmic resistor O and the choke coil winding 2 are employed as separate units or combined by providing the winding 2 with an increased ohmic resistance and dispensing with the separate resistor O.

The increased effect of the choke coil can also be achieved by providing the said coil with a secondary winding which is correspondingly dimensioned and connected in the shunt winding circuit in such a manner that an increasing main circuit current causes the choke coil to have a weakening effect on the field. This arrangement is diagrammatically illustrated in Fig. 9 and requires no further explanation. The designation of the component parts is identical with that adopted for the other figures. The secondary winding of the choke coil E is designated by the reference numeral 3, to differentiate between winding 2 shown in Fig. 6.

The constructional examples so far used to illustrate the invention have, for the sake of simplicity always referred to bipolar machines. The invention is, however, by no means restricted to bipolar machines and all the arrangements already illustrated can be applied equally well to multi-polar machines. The constructional example shown in Fig. 10 is applied to an arrangement used in connection with a four-pole machine.

With multipolar machines, brushes having the same sign can be mutually displaced from their neutral position and connected together. The cross-magnetizing field then causes a compensating current to flow between the brushes, this current adding itself to the external working current. This compensating current can be utilized to give the machine the characteristic that the sign of the voltage delivered by the machine is independent of the direction of rotation. This arrangement combined with series excitation windings arranged in accordance with the invention, results in a machine which is particularly suited to the conditions encountered in welding and similar services.

Figure 10:
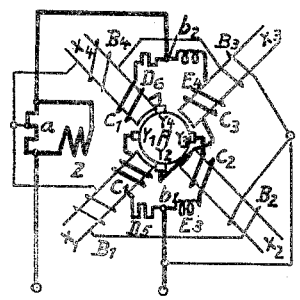
Figure 10:

Fig. 10 shows a constructional example of the invention. The brushes $Y_1$, $Y_2$, $Y_3$ and $Y_4$ are displaced from their neutral position. The series windings $C_1$, $C_2$ on the poles $X_1$, $X_2$, respectively, are connected between the brushes $Y_1$ and $Y_3$. At $b_1$ in the connection between the windings $C_1$ and $C_2$, the external current lead is connected. In accordance with the invention a choke coil $E_3$ is connected to one side of the point $b_1$ and an ohmic resistor $D_5$ to the other side. The other poles $X_3$, $X_4$ of the machine are similarly connected. The series windings $C_3$, $C_4$ lead to the brushes $Y_2$, $Y_4$ and are joined to the point $b_2$ where the other lead for the external current is connected. At one side of $b_2$ is the choke coil $E_4$ and at the other side a resistor $D_6$ may be connected in the circuit.

The magnetizing and demagnetizing series windings are arranged on different poles. Each pole could of course carry a magnetizing and a demagnetizing winding.

Each pole carries, in addition, a shunt winding $B_1$, $B_2$, $B_3$ and $B_4$ respectively, these windings being either all connected in series or parallel or combined series-parallel.

The interpole winding Z is shown in the outgoing circuit from the point $b_2$. A shunt $a$ is connected in parallel with the interpole winding, the shunt excitation circuit being connected to this shunt at a suitable point. It has been determined that in many cases it is an advantage to connect a small reactor in series with the shunt in order to be certain that a reversal of polarity cannot occur.

The shunt $a$, from which an excitation current proportional to the terminal voltage is taken off, has the same effect as additional windings which produce a demagnetization of the interpoles proportional to the terminal voltage. This effect is more obvious when the excitation circuit is connected direct to a suitable tap on the interpole winding Z, the shunt $a$ being retained if so desired. According to the invention it is also possible to replace the shunt $a$ by suitable auxiliary windings, arranged on the interpoles and which are either shunt or separately excited.

The arrangement shown in Fig. 10 is not restricted to multi-polar machines. To obtain the same effect with bipolar machines the arrangement shown in Fig. 11 has been used. In this example both the poles and the brushes are split. The poles may be divided either axially or tangentially. There is of course no reason why the brushes and poles of multi-polar machines should not be likewise split.

The following constructional example of the invention indicates how the effect of displacing or splitting the brushes, i. e. a supplementary excitation, can be obtained in another way when using standard parts. With this object in view this supplementary excitation of the main poles is provided by a small auxiliary machine which is excited from the working current of the main machine.

Figure 13:
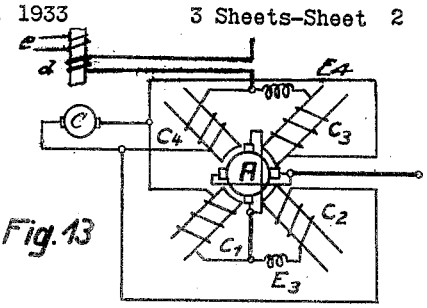
Figure 12:
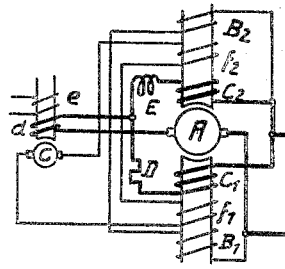
Figure 12:

Two examples of this arrangement are illustrated in Figs. 12 and 13. The fundamental principle is shown in the two-pole diagram in Fig. 12. The armature A is magnetized by the shunt windings $B_1$, $B_2$. The main poles carry the series windings $C_1$, $C_2$, the magnetizing winding $C_2$ having a choke coil E connected in series with it. The main current also flows through the excitation winding $d$ of the small auxiliary machine $c$ the armature current of which feeds the supplementary excitation windings $f_1$, $f_2$ on the main poles of the main machine. The small auxiliary machines can in addition also be shunt or separately excited through the winding $e$.

Figure 14:
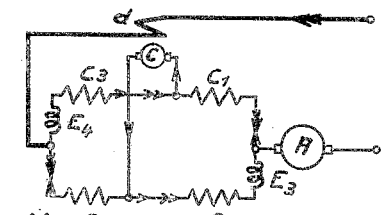
Figure 14:
Figure 11:
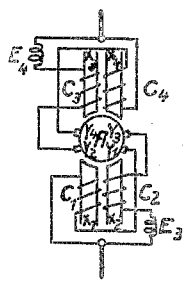
Figure 11:
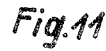

Machines with four or more poles, or with split poles as in Fig. 11, can according to the invention be arranged in the very simple manner shown in Fig. 13. The supplementary excitation current flows through excitation windings which are supplied with main current. Fig. 14 illustrates this arrangement diagrammatically. By means of the double arrows indicating the path of the main current and the single arrows showing the path of the auxiliary current, the direction taken by the currents is readily discernible. The magnetic fields produced by the currents support each other in the magnetizing series windings $C_2$, $C_3$ which are connected in series with the choke coils $E_3$, $E_4$, and in the demagnetizing windings $C_1$, $C_4$ the currents oppose each other.

Up to the present no reference has been made to the constructional arrangement of the interpole windings. It is of course assumed that the simplest and more usual form of concentrated interpole coil will be employed. By using the known arrangement of an interpole winding and a distributed compensating winding in conjunction with a machine built in accordance with the invention, definite advantages can be obtained.

The usual advantages of such compensating windings are well known. They consist in a reduction of the iron losses as a result of the field distortion being eliminated. In many cases a reduction of the maximum commutator segment voltage, resulting from the same considerations as before, is also of importance.

These generally known advantages of the compensating winding also apply to a machine built in accordance with the invention. A distributed compensating winding is, however, especially suitable for obtaining the desired characteristics of a constant current machine, particularly when used for arc welding. The equalizing current occurring between the double brushes when the operating conditions vary, assumes its most favourable course when the cross field is maintained as nearly as possible symmetrical to the cross axis. When using an ordinary concentric interpole winding fluctuations always arise in the resulting magnetizing cross axis when the current varies, and these fluctuations have an undesirable effect on the course of the equalizing current. With a distributed compensating winding the axis of the cross field is always in agreement with the geometric cross axis, so that the equalizing current attains to a high degree the desired value.

Under certain circumstances the cross winding of the stator may be designed as a pure compensating winding, that is, without actual interpole coils.

The regulating and adjustment of the working current to which no reference has so far been made, is now described in conjunction with a machine built in accordance with the invention. Several constructional examples of the current regulation applied to this machine are illustrated in the drawings.

A very simple device is shown in Fig. 15, whereby the magnetic resistance of the interpoles is altered. The core of the interpole $h$ is provided with one or more cylindrical recesses into which iron pins $g$ are inserted to a greater or lesser depth. When all the cylindrical openings in the core are entirely filled by the iron pins, then the magnetic resistance of the interpole circuit is at its minimum and the adjustable current strength at its maximum.

The alteration of the magnetic resistance of the interpole circuit need not, however, be accomplished by altering the position of the inserted iron pins. This can be achieved in the very advantageous manner illustrated in Figs. 16, 17 and 18, whereby the saturation of the iron at some point or other in the interpole circuit, preferably in the interpole cores themselves, is artificially strengthened or weakened. In Fig. 16 the interpole core is divided into two halves $k_1$ and $k_2$. The windings $Z_1$ and $Z_2$ on these halves are connected in parallel over a resistor 1 which is made either adjustable or provided with taps. It is assumed that the windings $Z_1$, $Z_2$ are equally dimensioned. When the resistor is short circuited the currents through the windings will be equal and the interpole flux assumes the course shown by the chain-dotted lines $x$. In this case the magnetic resistance has its minimum value and the external current is at its maximum. When the resistor 1 is connected up in series, the current flowing through one of the windings is reduced and a flux is created which takes the course shown by dotted lines $y$ in Fig. 16. This flux flows entirely in the iron and assumes a considerable value so that the iron becomes more or less saturated. The resulting magnetic resistance of the interpole circuit is thereby increased and the working current of the machine reduced.

A possible variation of the above described arrangement is illustrated diagrammatiaclly in Fig. 17. Z is the actual interpole winding which encloses the interpole core which is again divided into two halves $k_1$ and $k_2$. One limb is provided with an extra saturation winding $Z_s$. When this winding is excited an additional flux is produced, taking the course shown by the dotted lines, and the resulting magnetic resistance referred to the useful interpole flux, is increased.

The constructional example in Fig. 18 shows the interpole core divided into three parts $k$, $k_1$ and $k_2$. The saturation winding $Z_s$ is arranged on the middle limb $k$ and when supplied with an excitation current produces an additional flux along the dotted lines shown in the figure.

A further simple regulation of the effective current is available when the interpole cores and pole shoes are divided in the axial direction. These arrangements are illustrated in the Figs. 19, 20, 21 and 22, Figs. 19 and 20 referring to a constructional example with the pole core divided into three parts and Figs. 21 and 22 showing a similar arrangement for a two-part interpole core.

In these figures A is the armature, $m$ the yoke, and $k_1$, $k_2$ and $k_3$ the part poles with pole shoes $n_1$, $n_2$, $n_3$. The part poles are provided with excitation windings $Z_1$, $Z_2$ and $Z_3$, fed from the main current and can be individually switched out or short circuited. The windings on the part poles can be connected either in series or parallel. The effective external current of the machine then adjusts itself in accordance with the number of part poles carrying windings through which current is flowing, and is dependent on the current strength in the individual windings.

In the example shown in Fig. 20 there is in addition to the windings on the part poles, a further winding Z which encloses all these partial windings. This additional winding enables various combined effects to be obtained and provides a finer regulation of the load current.

An entirely steady current regulation can be obtained when one or more of the interpole cores are made to be rotated as shown in Figs. 21 and 22, so that the correspondingly constructed interpole shoes can be turned towards a main pole having opposite polarity.

The two-part interpole shown in Figs. 21 and 22 is equipped with eccentric pole shoes $n_1$, $n_2$ which can be displaced by rotating same. In Fig. 22 two limit positions are shown, one dotted and the other in full lines. When in the position indicated by the full lines, the flux flowing from the interpole to the armature is at a maximum and the operating current of the machine is also at its maximum value. In the position shown dotted, a strong leakage flux flows to the adjacent main pole having opposite polarity and this causes an additional saturation of the interpole cores resulting in an increased magnetic resistance which reduces the operating current.

Naturally the arrangement with rotatable part poles described above is equally applicable to any number of part poles.

A very simple arrangement for regulating the operating current of a direct current generator according to the invention, consists not in varying the magnetic resistance but in regulating the strength of the current in several or all interpole windings. This can be done in a constant manner by means of parallel resistors.

The constructional example illustrated in Fig. 23 refers to a four-pole machine. A is the armature, $B_1$ to $B_4$ the shunt excitation windings, $C_1$ to $C_4$ the series windings supplied with main current and characterizing the invention, and $Z_1$ to $Z_4$ the interpole windings. A shunt $a_1$ is connected in parallel with the four series-connected interpole coils, the shunt excitation windings $B_1$ to $B_4$ being connected to the shunt at a suitable point. This arrangement has already been described and illustrated in Fig. 10. The improvement consists in adding to this arrangement a resistor $a_2$ which can be connected in parallel with some or all of the interpole coils. In Fig. 23 it will be seen that the resistor $a_2$ is connected in parallel with two of these windings. This arrangement has proved itself particularly advantageous because the coils which are supplied with the full current can maintain the machine definitely stable.

Regulation of the working current by means of altering the current in the interpole windings can in accordance with the invention be supplemented by regulation by brush displacement. It is unnecessary to displace all brushes simultaneously. The intended effect is also obtained by displacing only certain of the brushes. It may in certain cases be useful to operate this regulation by means of several brush bridges some of which can be moved, while the remaining ones are kept stationary. Naturally regulation of the current may be obtained by brush displacement alone without altering the current in the interpoles.

The operating current can not only be influenced by regulating the strength of the current flowing through the interpole coils, but also in an equally simple manner by regulating the current in the series windings on the main poles by shunting the compound or differential compound winding. Without further explanation it will be clear that a reduction in the number of compound ampere turns will result in reduced operating current and that a reduction of the differential compound ampere turns will increase the current. The current can also be regulated by means of taps or simply by connecting certain windings or parts of windings in series parallel.

The invention claimed is:—

1. In a direct current generator, the combination with an armature, a field structure including poles, and a shunt field winding, of means for reducing the variation of generator output voltage with sudden changes in output current; said means including two series windings in parallel, one series winding being cumulative and the other differential with respect to said shunt field winding.

2. A generator as claimed in claim 1, wherein the reactive impedances of said series windings are unequal, and the differential series winding has the lesser reactive impedance.

3. A generator as claimed in claim 1, wherein the self-inductances of the said series windings are substantially equal and said series windings are on separate poles of said field structure, and a magnetic shunt is associated with the pole carrying the cumulative series winding.

4. In a direct current generator, the combination with an armature and a shunt field winding, of means for reducing the variation of generator output voltage with changes in output current, said means comprising a pair of parallel field excitation circuits having substantially different reactive impedances for sudden changes in current flow and reactive impedances of the same order for slow changes in current flow, each circuit including a series field excitation winding, one of said excitation windings being cumulative and the other differential with respect to said shunt field winding, and the winding in the circuit of lesser impedance being the differential winding.

5. A generator as claimed in claim 4, wherein said excitation windings are substantially identical, and impedance is included in at least one of said field excitation circuits to produce the substantial difference in the reactive impedances of said circuits.

6. In a direct current generator, the combination with an armature and a shunt field excitation winding, of a pair of field excitation circuits connected in parallel with each other and in series with respect to current flow in the output circuit of said generator, one excitation circuit including a series field winding which is cumulative with respect to current flow in the said shunt excitation winding and the other excitation current including a series field winding which is differential with respect to current flow in said shunt, and means operative on sudden changes in output current flow to raise the reactive impedance of the cumulative series excitation circuit at a rate substantially in excess of the rate at which the reactive impedance of the differential series excitation circuit is increased by the same sudden changes in output current flow.

7. A generator as claimed in claim 6, wherein said means comprises magnetic circuits of different magnetic characteristics for the said series winding, the magnetic circuit of said cumulative series winding including a magnetic shunt.

8. A generator as claimed in claim 6, wherein said means comprises an inductance in said cumulative series field excitation circuit and in series with said cumulative series winding.

9. A generator as claimed in claim 6, wherein said means comprises an inductance in series with said cumulative series winding, and a second inductance in series with both of said series windings, and coupling between said inductances in such sense that the total series current flow in said second inductance adds to the magnetic field established current flow in said first inductance.

10. A generator as claimed in claim 6, wherein one pair of adjacent terminals of said series excitation circuits are connected by a resistance, and an adjustable tap on said resistance is connected to a terminal of the generator.

11. A direct current generator comprising an armature, a pair of brushes cooperating therewith, a shunt field winding, a pair of series windings, one series winding being cumulatively wound and the other differentially wound with respect to said shunt winding, one terminal of each series winding being connected to one brush, a generator terminal connected to the other brush, and means including an inductance in series with only the cumulative series winding completing the circuit from the second generator terminal to the second terminals of said series windings.

12. A generator as claimed in claim 11, wherein said means includes a second inductance in series with both of said series windings, and means coupling said inductances in such sense that additive magnetic fields are established by current flaw in the said inductances.

13. A direct current generator comprising an armature, a plurality of main field poles, a plurality of interpoles, a shunt field winding on said main poles, a pair of series windings on the main poles and in parallel with each other, one series winding aiding and the other opposing the magnetic field established by said shunt winding, said windings having reactive impedances of a like order for slow change in current flow, means cooperating with the aiding series winding to render the same more slow to respond to sudden current changes than the opposing series winding, and series excitation windings on said interpoles.

14. A generator as claimed in claim 13, in combination with means adjustable to regulate the current flow simultaneously in a plurality of said windings.

15. A generator as claimed in claim 13, in combination with means including an adjustable resistor connected in parallel with certain of the windings on said interpoles for regulating the flow of current therethrough.

16. A direct current generator comprising an armature, a field structure having a plurality of pairs of poles, a shunt excitation winding, additional excitation means automatically suppressing current fluctuations when the generator is short circuited, said additional excitation means including a pair of series windings, one series winding being cumulatively wound and the other differentially wound with respect to said shunt winding, said shunt winding comprising a pair of parallel connected sets of windings, a connection from one terminal of said sets of shunt windings to a generator terminal, and a connection including an adjustable resistance between the second terminal of said sets of shunt windings and the second generator terminal.

17. A generator as claimed in claim 16, in combination with a plurality of pairs of interpoles, series excitation windings on said interpoles, and adjustable means for regulating current flow in said cumulative and differential series windings.

18. In a direct current generator, an armature including four main poles and four interpoles, a shunt field excitation winding on each main pole, and additional excitation means automatically suppressing current fluctuations when the generator is short circuited; said additional excitation means including a series winding on each main pole, circuit connections for establishing a current flow in two series windings to add to the magnetization of the shunt field windings and a current flow in the other series windings which opposes the magnetization of the other windings, and series field windings on said interpoles.

19. A generator as claimed in claim 18, wherein the said series windings on said interpoles are connected in series across a series resistance in the generator output circuit.

20. A generator as claimed in claim 18, wherein the said series windings on said interpoles are connected in series across a series resistance in the generator output circuit, in combination with an adjustable resistance shunted across certain of said serially connected series windings.

21. A generator as claimed in claim 18, wherein the said series windings on said interpoles are connected in series across a series resistance in the generator output circuit, and said shunt windings are arranged in two parallel groups of two windings, one terminal of said groups being connected to a generator terminal and the other terminal of said groups comprising a tap adjustable along said series resistance.

22. In a direct current generator, the combination with an armature, and a shunt field winding, of means for reducing the variation of generator output voltage with sudden changes in output current; said means including a pair of series field windings and magnetic circuits of different magnetic inertias for the respective series windings, one series winding being cumulatively wound and the other differentially wound as compared with said shunt field winding, said magnetic circuits constituting means for imparting to said cumulative series winding an impedance to sudden changes in current flow which is greater than the corresponding impedance of said differential series winding.

23. A direct current generator as claimed in claim 22, wherein the magnetic circuit of said cumulative series winding includes a magnetic shunt.

LUDWIG ROEBEL.